United States Patent [19]

Suzuki

[11] Patent Number: 5,424,800
[45] Date of Patent: Jun. 13, 1995

[54] CAMERA HAVING SOLAR BATTERY AND SECONDARY BATTERY

[75] Inventor: Ryoichi Suzuki, Yokohama, Japan

[73] Assignee: Canon Kabushiki Kaisha, Tokyo, Japan

[21] Appl. No.: 282,770

[22] Filed: Jul. 29, 1994

Related U.S. Application Data

[63] Continuation of Ser. No. 116,614, Sep. 7, 1993, abandoned.

[30] Foreign Application Priority Data

Sep. 10, 1992 [JP] Japan .................................. 4-266811
Jun. 22, 1993 [JP] Japan .................................. 5-173607

[51] Int. Cl.$^6$ .................................................. G03B 7/26
[52] U.S. Cl. .................................. 354/484; 320/48; 340/516; 340/636
[58] Field of Search .................. 354/484; 320/48; 340/516, 636

[56] References Cited

U.S. PATENT DOCUMENTS

| | | | |
|---|---|---|---|
| 3,997,831 | 12/1976 | Hopfner | 320/48 |
| 4,328,456 | 5/1982 | Suzuki et al. | 354/484 |
| 4,449,057 | 5/1984 | Ishiwata | 354/484 |
| 4,494,854 | 1/1985 | Yamagu et al. | 354/484 |
| 4,972,181 | 11/1990 | Fiene | 340/636 |

FOREIGN PATENT DOCUMENTS 60-48025  3/1985  Japan .

*Primary Examiner*—Russell E. Adams
*Attorney, Agent, or Firm*—Fitzpatrick, Cella, Harper & Scinto

[57] ABSTRACT

A camera includes a solar battery, a secondary battery charged by the solar battery, a battery-checking circuit for checking a charged state of the secondary battery, an informing device for informing the charged state of the secondary battery checked by the battery-checking circuit, and a clock for operating the battery-checking circuit at predetermined intervals.

64 Claims, 6 Drawing Sheets

CAMERA HAVING SOLAR BATTERY AND SECONDARY BATTERY

This application is a continuation of prior U.S. application Ser. No. 08/116,614 filed on Sep. 7, 1993, now abandoned.

BACKGROUND OF THE INVENTION

1. Field of the Invention

The present invention relates to power supply for a camera, and more particularly, to a power-supply system having a solar battery (or solar cell) and a secondary battery.

2. Description of the Related Art

Lithium batteries with large storage capacities have recently been used as batteries for cameras. Lithium batteries are characterized not only by their large storage capacity but also by a relatively small self-discharge current and low internal-resistance. Lithium batteries may be the optimum power-supply for a camera; however, their drawback is that they still have a high retail price.

Recently, rechargeable lithium secondary-batteries have appeared on the market. Therefore, when the rechargeable secondary battery and a solar battery are used together, the battery power consumed by a camera can automatically be replenished by the solar battery. Thus, a long-lasting power-supply system is achieved.

However, the available surface area of a camera for providing the solar battery thereon is limited. The electromotive force of the solar battery is proportional to its area. Therefore, power obtained by the solar battery provided on the camera is inevitably limited.

In addition, when taking into consideration the fluctuation of the frequency of use of a camera and a condition of sunlight in the place where the camera is used, it is important to definitely inform a camera-user of a ready/not-ready status for photographing by means of clearly displaying the remaining amount of the secondary battery power.

A well-known method of informing a camera-user of the remaining battery power is to apply current from the battery to a load and then to determine the remaining amount of power from the voltage of the battery. In a power-supply system of a camera having a conventional primary battery, the remaining amount of battery power varies only when the camera is being used (except for the case when it varies due to a self-discharging from the battery). Therefore, when the battery-checking operation is conducted right after a releasing operation of the camera and, consequently, the display of the remaining amount of battery power is updated according to the checking results, a sufficiently reliable display of the remaining amount of battery power can be provided.

However, in the system where the solar battery and the secondary battery are used together, the charging operation from the solar battery to the secondary battery is conducted even when the camera is not in use, e.g. being carried or left on a shelf. Therefore, there has been a problem in that the display of the remaining amount of battery power does not provide a reliable indication if the battery-checking operation is not carried out to update the display of the remaining amount of battery power while the secondary battery is being charged.

On the other hand, power is needed for a microcomputer and peripheral analog circuit to carry out the battery-checking operation. Thus, power consumption to some extent in these circuits is unavoidable. Therefore, another undesirable problem occurs when the battery-checking operation is frequently conducted to raise the level of displaying accuracy to cope with an unexpectedly executed charging operation in the camera; namely, increased wasteful power-consumption occurs from the battery-checking operation itself.

SUMMARY OF THE INVENTION

It is one aspect of the present invention to provide a camera or a battery checking unit which comprises: a solar battery; a secondary battery to be charged by the solar battery; battery-checking means for checking a charged state of the secondary battery; informing means for informing a user of the charged state of the secondary battery checked by the battery-checking means; and clock means for operating the battery-checking means at predetermined intervals; wherein users can be appropriately informed of the charged state of the secondary battery which is charged by the solar battery.

It is another aspect of the present invention to provide a camera or a battery checking unit having the above-mentioned construction, wherein the clock means further comprises varying means for varying the predetermined intervals to operate the battery-checking means between the time period when the charging operation is expected to occur with a high frequency and the time period when the charging operation is expected to occur with a low frequency. Therefore, the camera or the battery checking unit can frequently execute the battery-checking operation during the daytime when the charging is frequently conducted, and also can execute less frequently or stop the checking operation during the nighttime when the charging is less-frequently conducted. Accordingly, the wasteful power-consumption caused by the checking operation itself can be greatly reduced without negatively affecting the reliability for displaying the charged state of the second battery charged by the solar battery.

It is yet another aspect of the present invention to provide an apparatus equipped with a solar battery or a battery checking unit of an apparatus equipped with a solar battery comprising a solar battery, a secondary battery to be charged by the solar battery, battery-checking means for checking a charged state of the secondary battery, informing means for informing the changed state of the secondary battery checked through the battery-checking means, and clock means for operating the battery-checking means at a predetermined interval.

Other aspect of the present invention will become apparent from the following description of the preferred embodiments of the present invention.

DESCRIPTION OF THE PREFERRED EMBODIMENTS

A detailed description of a first embodiment of the present invention will now be given in conjunction with the accompanying drawings constituting FIGS. 1 through 5.

Figure 1:
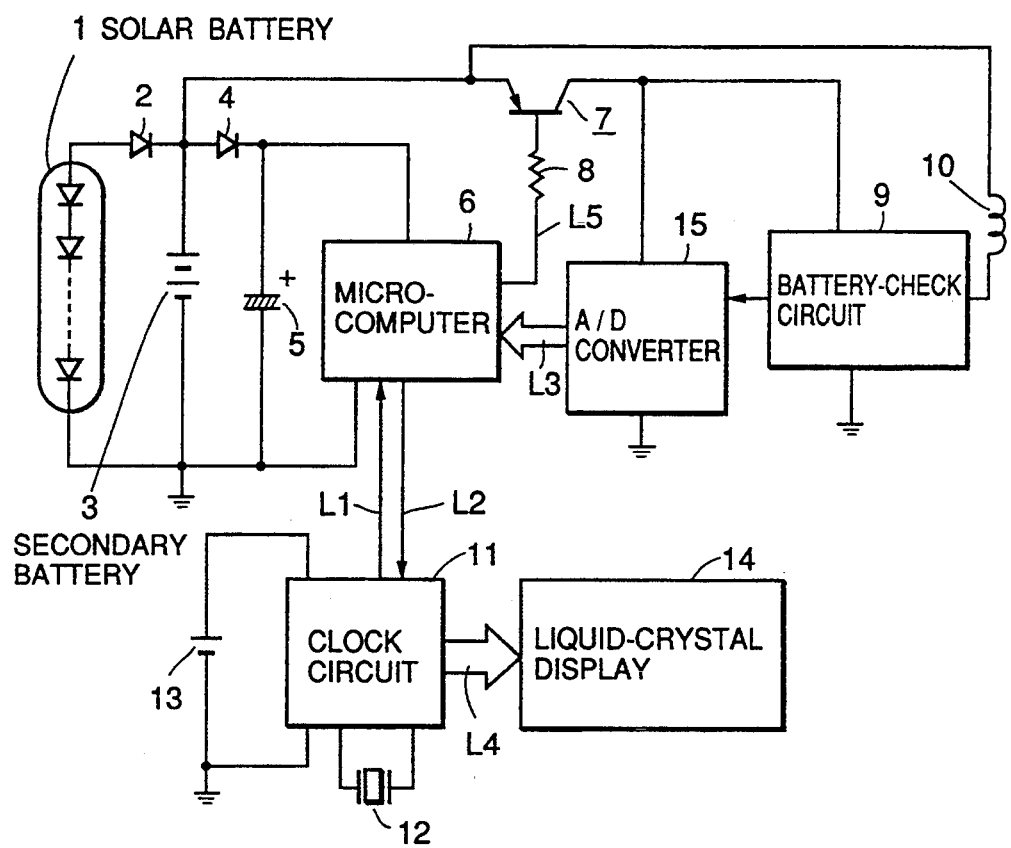
FIG. 1 is an electric circuit diagram of a first embodiment of a camera having a solar battery according to the present invention.

FIG. 1 is an electric circuit diagram of the embodiment of a camera according to the present invention. As shown in FIG. 1, reference numeral 1 represents a plurality of solar batteries connected in series. Numeral 2 indicates a backflow preventive diode which prevents backflow of current from the below-described secondary battery 3 to the solar battery 1. Reference numeral 3, more specifically, represents a lithium-ion type second battery to be charged by the solar battery 1, and reference numeral 5 represents a back-up capacitor. Those components represented by reference numerals 3 and 5 are connected in parallel via the backflow preventive diode 4 at respective positive-pole sides. Reference numeral 6 represents a one-chip microcomputer for controlling the camera. The microcomputer 6 and the capacitor 5 are connected in parallel. Reference numeral 7 represents a PNP transistor for switching the power-supply. A base of the transistor 7 is connected to the microcomputer 6 by means of line L5 via a current limiting resistor 8; an emitter of the transistor 7 is connected to the positive pole of the secondary battery 3 and also to the below-described load element 10; and a collector of the transistor 7 is connected to the below-described battery-check circuit 9 and A/D converter 15. Reference numeral 9 represents the battery-check circuit connected to the load element 10 and the A/D converter 15.

Figure 3:
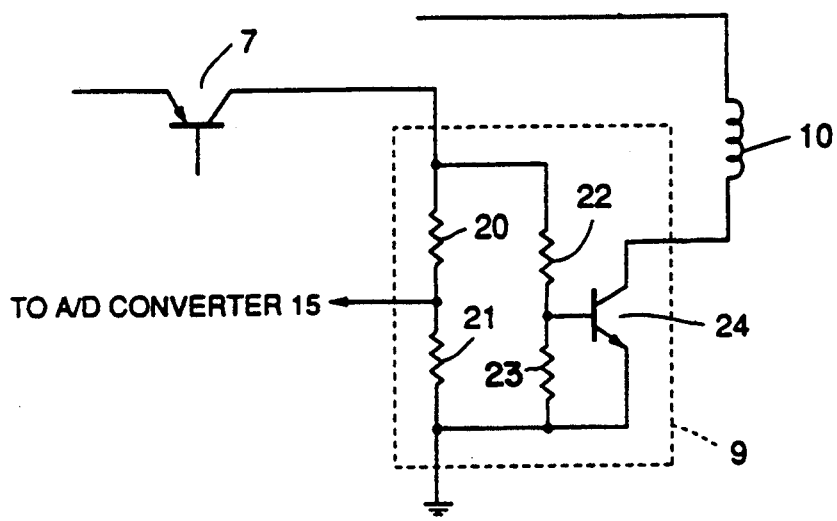
FIG. 3 is a concrete circuit-diagram of a battery-check circuit shown in FIG. 1.

A detailed configuration of the battery-check circuit 9 is shown in FIG. 3, in which numerals 20 and 21 are resistors connected to the collector of the transistor 7 for switching the power-supply, for a potential-dividing purpose, and voltage at the potential-dividing point is transmitted to the A/D converter 15. Numeral 24 in FIG. 3 represents a switching transistor. The load element 10 is connected to a collector of the transistor 24; a current limiting resistor 22 is connected between a base of the transistor 24 and the collector of the transistor 7; and a pull-down resistor 23 is connected between the base and emitter of the transistor 24.

When the transistor 7 for switching the power-supply is ON, the transistor 24 subsequently becomes ON; then, conduction to the load element 10 starts, and synchronously, the voltage divided by the potential-dividing resistors 20 and 21 are output to the A/D converter 15 as battery-check voltage to conduct the battery checking operation.

Again in FIG. 1, reference numeral 11 represents a clock circuit to which a crystal-controlled oscillator 12 oscillating at 32.768 KHz and a power-supply battery 13 are connected. Furthermore, the clock circuit 11 is connected by means of line L4 to a liquid-crystal display 14 for a clock-function display in addition to the function of a battery-check display; and the clock circuit 11 is also connected to the microcomputer 6 by means of lines L1 and L2. Incidentally, the secondary battery 3 could be substituted for the power-supply battery 13.

Figure 4:
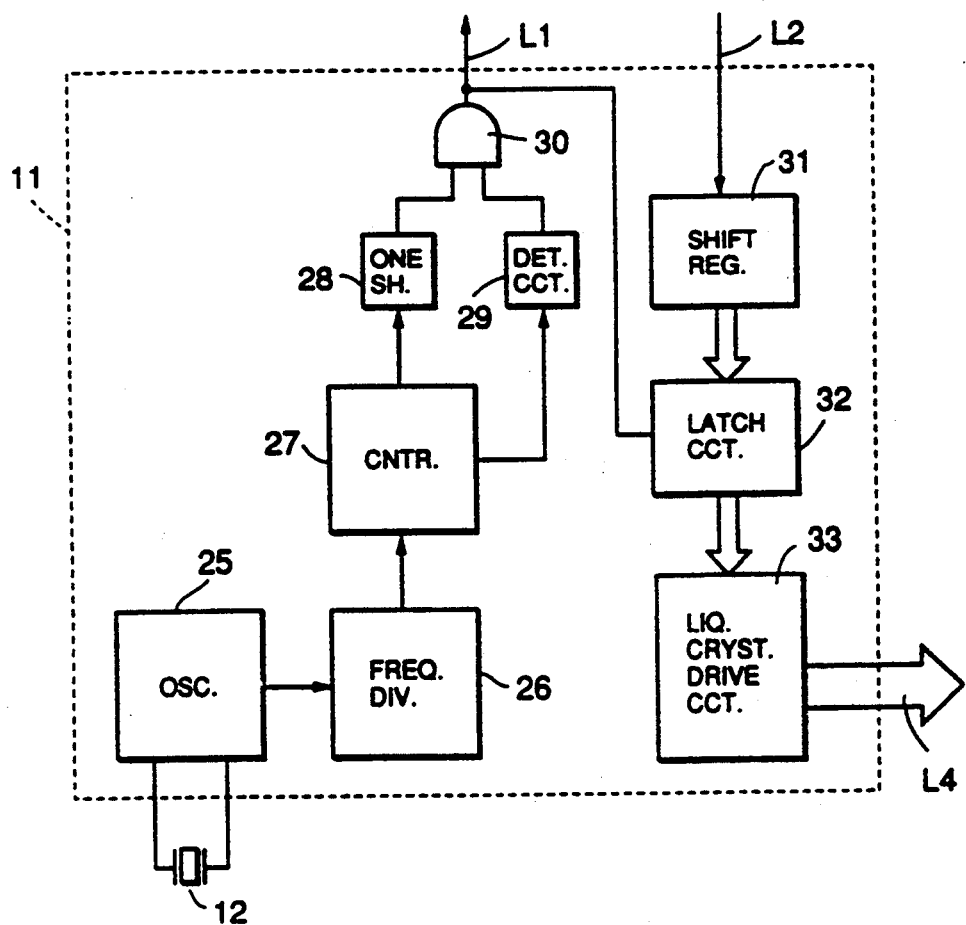
FIG. 4 is a concrete circuit-diagram of a clock circuit shown in FIG. 1.

A detailed configuration of the clock circuit 11 is shown in FIG. 4, in which numerals 25, 26, and 27 represent, respectively, an oscillator circuit oscillating with a frequency of 32.768 KHz, a frequency-dividing circuit for dividing an oscillated output from the oscillator circuit 25, and a counter operating by receiving an output from the frequency-dividing circuit 26 for counting "time" (counting HOUR). Numeral 28 is a one-shot-pulse generating circuit which generates a single one-pulse for several 10's msec. per hour whenever the counter 27 for counting "time" updates the "time" counting. Numeral 29 in FIG. 4 represents a daytime/-nighttime determining circuit which is constituted to conduct frequency dividing of the output of the "time" counter 27 so as to make the output become a high level from 6 a.m. to 6 p.m. and a low level from 6 p.m. to 6 a.m. Reference numeral 30 is an AND-gate for two inputs which are output of the one-shot pulse 28 and output of the daytime/nighttime determining circuit 29. As an output from the AND-gate 30, a single pulse of several 10's msec. per hour is generated during the daytime, from 6 a.m. to 6 p.m. The microcomputer 6 receives the single pulse to conduct the battery-checking operation.

Numeral 31 represents a shift register which converts serial data from the microcomputer 6 to parallel signals. Numeral 32 indicates a latch circuit which latches the parallel signals from the shift register 31 by synchronizing with the pulse signal from the AND-gate 30. Numeral 33 is a liquid-crystal drive circuit which continuously generates a signal for driving a liquid-crystal display 14 in line L4 based upon the latched signal of the latch circuit 32.

From the foregoing configuration, the displayed contents of the liquid-crystal display 14, which is normally in the displaying mode, can be updated based upon the output signal of the A/D converter 15 at a battery checking period.

Again in FIG. 1, the A/D converter 15 performs A/D conversion of the battery voltage from the battery-check circuit 9, and provides the voltage to the microcomputer 6. The microcomputer 6 and the clock circuit 11 are always biased; however, the microcomputer 6 is normally in a hold mode. Therefore, the amount of consumed current is very small. In addition, the clock circuit 11 is constantly under operation; however, the amount of consumed current is small due to the low frequency of the basic pulse, i.e. 32.768 KHz. Accordingly, the total current-consumption is kept at a low level, and the amount of battery consumption is very small.

An operation of the embodiment of the camera having the above-mentioned configuration according to the present invention will now be given.

As described before, the clock circuit 11 operates constantly. A hard logic of the circuit 11 is constructed so as to generate, for instance, one short-pulse per hour in the line L1 from 6 a.m. to 6 p.m. When the short-pulse is being generated, the microcomputer "wakes up" from the hold mode to invert the level of the line 5 into a low level, and cause the transistor 7 to be ON.

Thus, the battery-check circuit 9 is supplied with power, and conduction to the load element 10 is performed. The battery-check voltage corresponding to the voltage of the secondary battery 3 at this time (actually the collector voltage of the transistor 7) is transmitted to the A/D converter 15, and the A/D conversion is conducted as described before. The A/D-converted value is then transmitted to the microcomputer 6 in parallel. Subsequently, the transmitted value is converted to serial data in the microcomputer 6 and then transmitted to the clock circuit 11.

In the clock circuit 11, the state of the remaining battery-power display of the liquid-crystal display 14 is updated via the line L4 based upon the above-mentioned transmitted value. Then, the pulse from the line L1 in the clock circuit 11 is extinguished; the level of the clock circuit 11 becomes low; the microcomputer 6 goes to the hold mode and, at the same time, the line L5 is returned to a high level; and the transistor 7 turns OFF.

Consequently, the electric circuit can be reset to be the initial mode.

Figure 5:
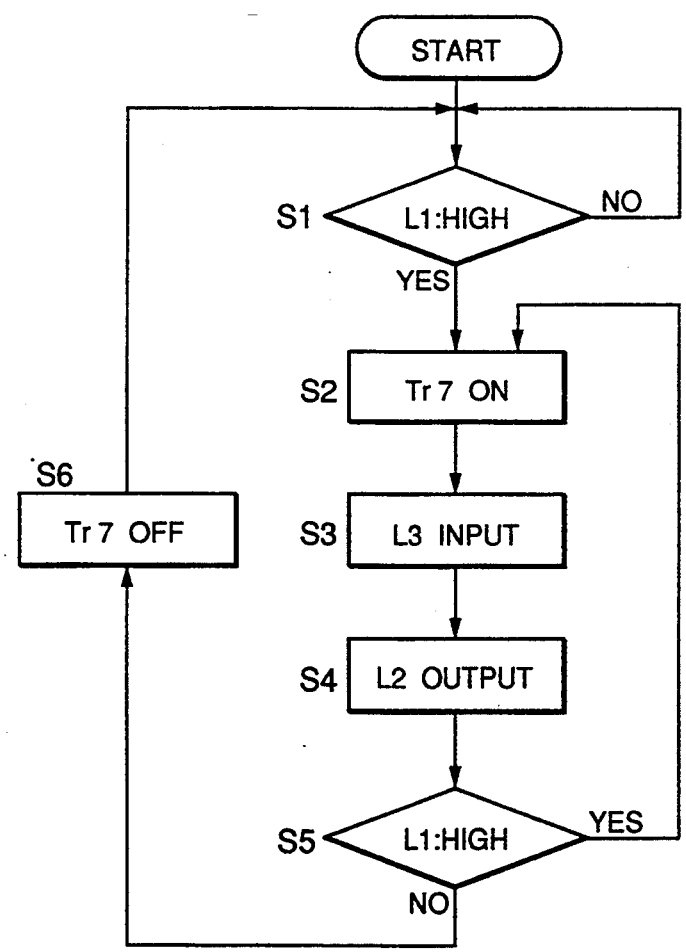
FIG. 5 is a flowchart illustrating an operation of the circuit shown in FIG. 1.

A flowchart in FIG. 5 showing the operation of the microcomputer 6 illustrates the aforementioned operation of the camera.

The microcomputer 6 conducts a sequential operation in accordance with the following steps:

In a step 1, the microcomputer 6 makes a decision whether the L1 input signal is at a high level or a low level;

In a step 2, the PNP transistor 7 for switching power-supply becomes ON when the L1 signal is at a high level;

In a step 3, a parallel signal L3 from the A/D converter 15 is input;

In a step 4, the parallel signal input from L3 is converted to a serial signal which is then transmitted in series from the L2 line to the clock circuit 11.

In a step 5, the microcomputer 6 again makes a decision whether the L1 input signal is at the high level or the low level. When it remains at the high level, the operation starting from the step 2 is repeated; and In a step 6, when the L1 signal is inverted into the low level, the PNP transistor for switching power-supply turns OFF, and this sequential operation is in a stand-by mode in the step 1.

In the preferred embodiment, the transistor 7 for switching power-supply turns ON while the pulse signal is generated from the clock circuit 11, and thus the battery-checking operation is conducted.

As described before, the clock circuit 11 generates the pulse on the line L1 during the daytime only; therefore, the battery operation can be performed only in the daytime. The frequency of the pulse signal must be suitably set so as to reduce an unnecessary battery-consumption, as much as possible, by taking into consideration power consumed in the battery-checking operation and a varied charging amount of the secondary battery 3, and to enable a relatively fine display of the varied charging amount of the secondary battery 3.

Meanwhile, the period of time for the pulse generation is not limited from 6 a.m. to 6 p.m. as described before, but allows various settings taking into consideration a local daylight duration.

Figure 6:
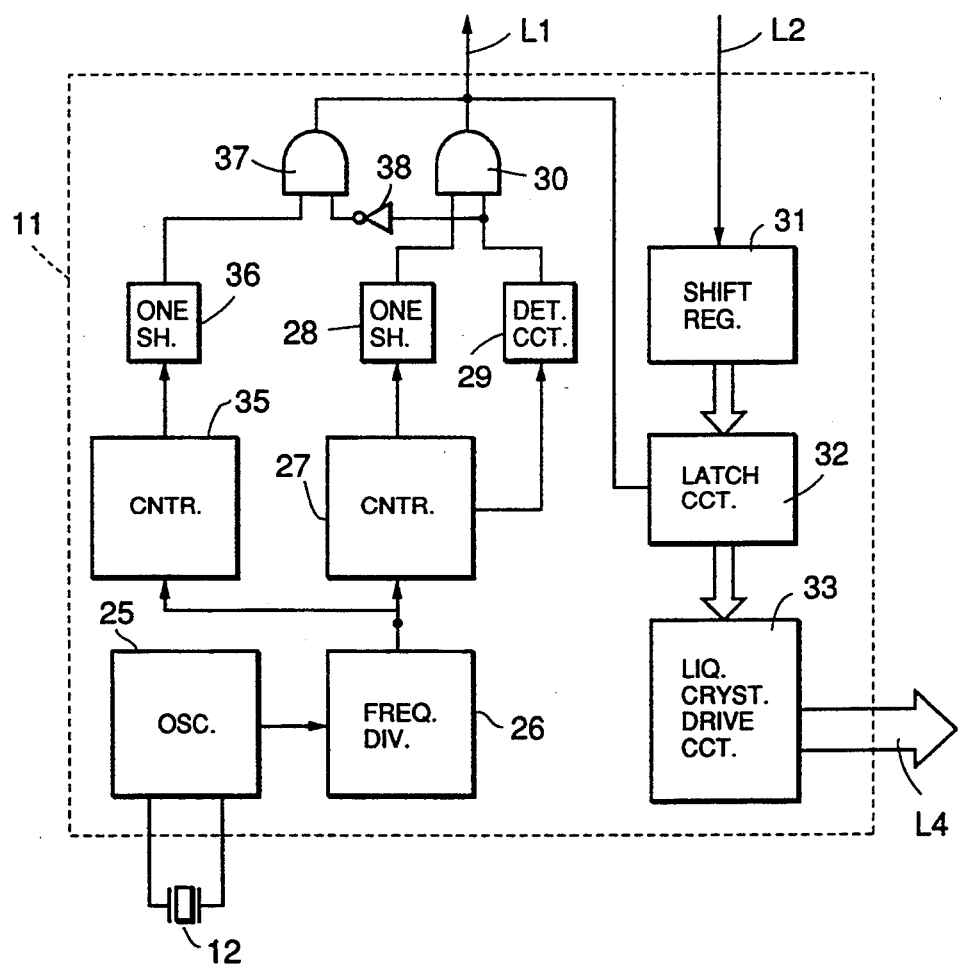
FIG. 6 is another circuit diagram illustrating a modified example of the clock circuit shown in FIG. 4.

In addition, the frequency of the battery check could be set, upon request, relatively lower than the above-mentioned frequency of that in the daytime instead of completely stopping the battery check at night. As shown in FIG. 6, it is also possible whenever a counter 35 performing "4-hour" counting, for instance, counts the period of time of 4 hours when the counter 35 receives the output of the frequency-dividing circuit 26, one-shot-pulse generating circuit 36 can input one pulse for several 10's msec. to an AND-gate 37 ; the single pulse for several 10's msec. per 4 hours can be output from the AND-gate 37 on the line L1 from 6 p.m. to 6 a.m. by the output, which is input to the AND-gate 37 via an inverter 38, of the daytime/nighttime determining circuit 29; and consequently the battery-checking operation similar to the one described before can be executed.

Figure 2:
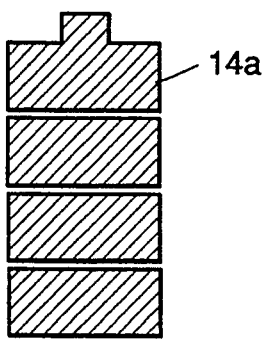
FIG. 2 is an illustration of a displaying status of an liquid-crystal display shown in FIG. 1.

FIG. 2 shows the configuration of the remaining battery-power display of the liquid-crystal display 14.

As shown in the same FIG. 2, the remaining battery-power is represented by length 14a in a bar style, for instance, according to voltage of the secondary battery 3. Especially, the remaining amount of the battery can be easily detected and displayed when a lithium-ion battery is used as the secondary battery because the voltage of the lithium-ion battery has approximately a linear-function relationship with the remaining capacity of battery-power. The display shown in FIG. 2 indicates that the battery power is in a full capacity.

Various kinds of displaying styles such as numbers and graphs can be used without being limited to the above-mentioned bar style.

Figure 7:
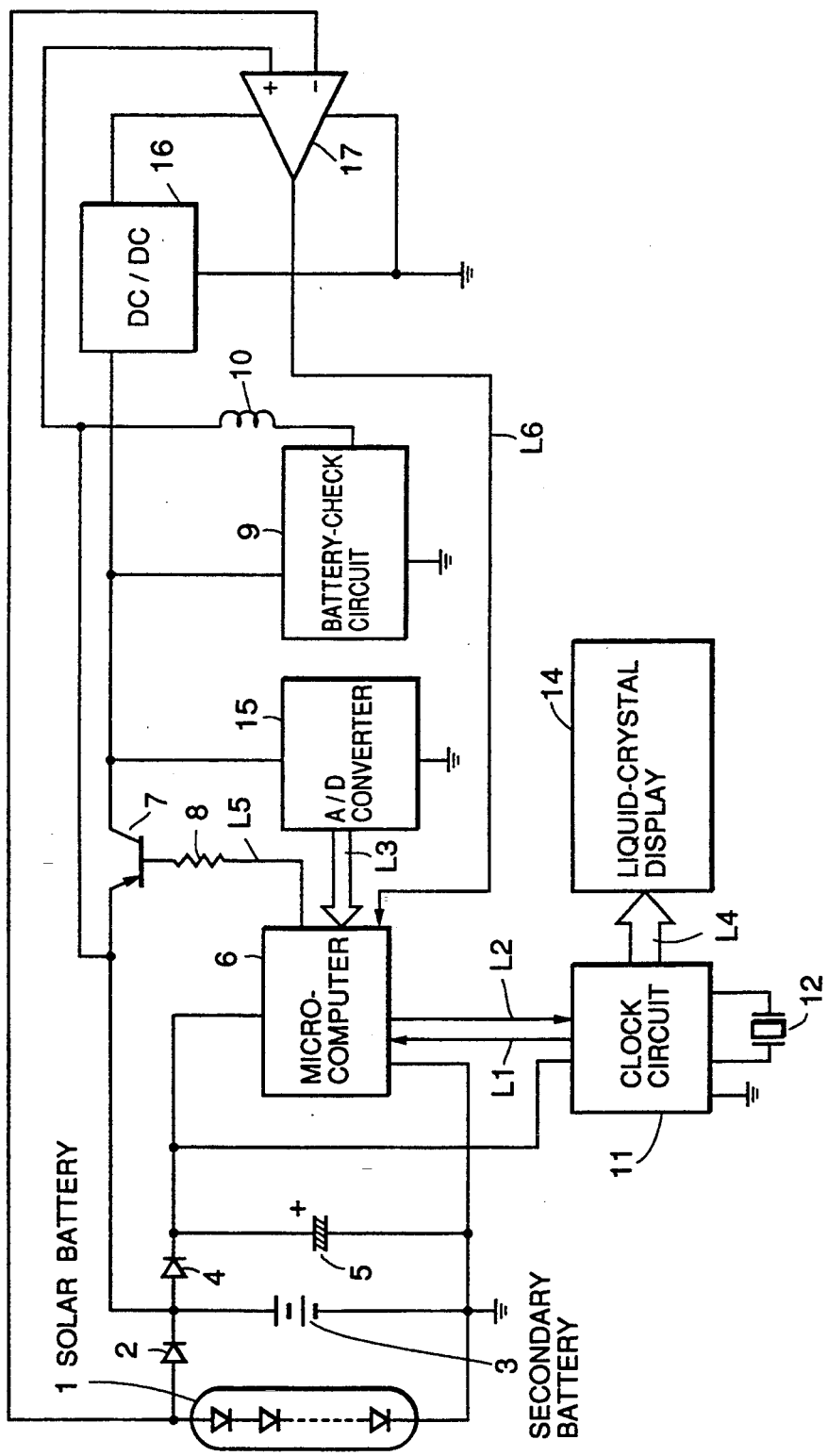
FIG. 7 is an electric circuit diagram of a second embodiment of a camera having a solar battery according to the present invention.
Figure 8:
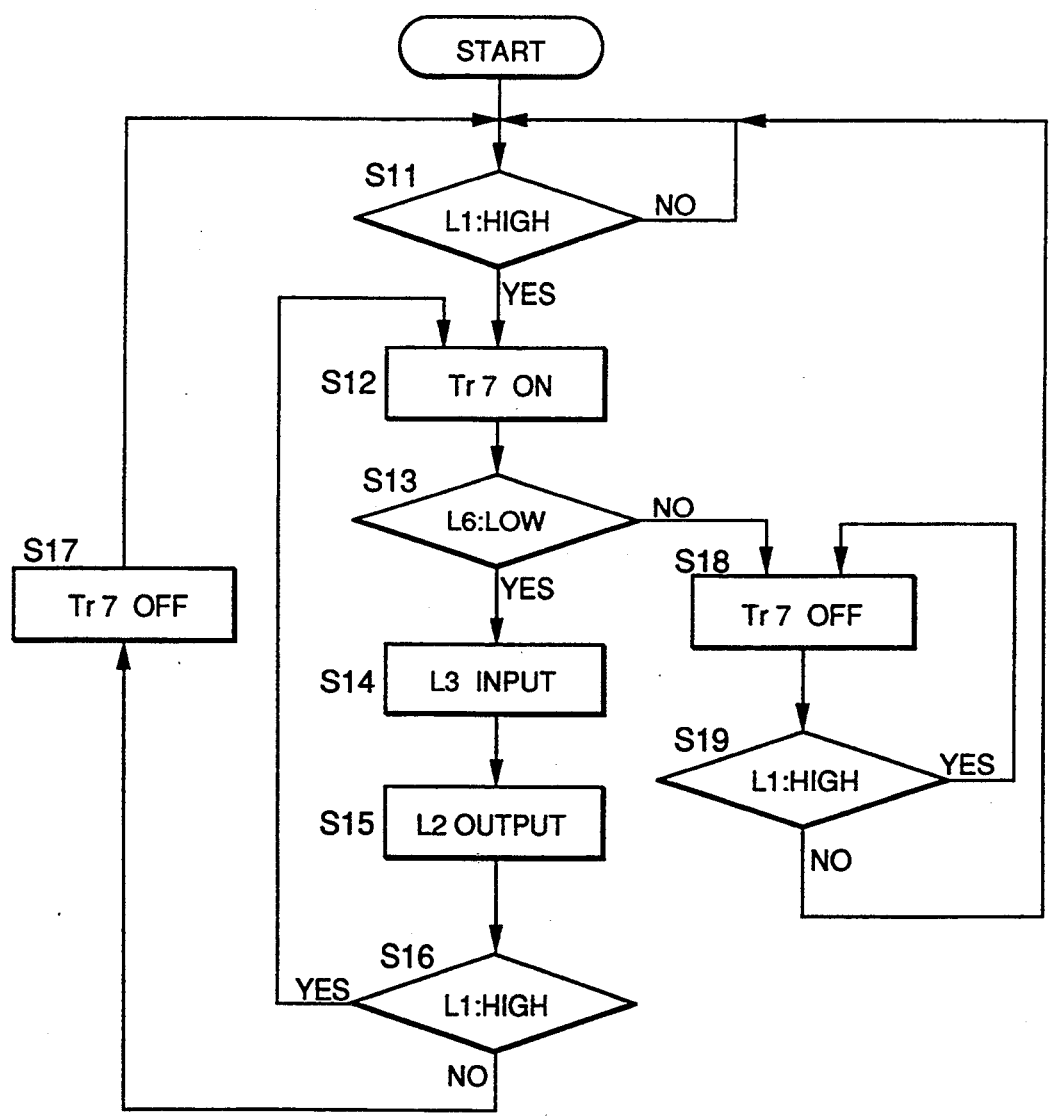
FIG. 8 is a flowchart illustrating an operation of the circuit shown in FIG. 6.

FIGS. 6 and 7 show the second embodiment according to the present invention. For the sake of simplicity, identical reference numerals in the aforementioned first embodiment are employed to indicate identical parts in the second embodiment. Description of those identical parts are omitted, and only different points are illustrated in the second embodiment.

In the second embodiment, a boosting circuit 16 is connected to the collector of the above-mentioned switching transistor 7; a negative input terminal of a comparator 17, which receives the output of the boosting circuit 16 as power supply, is connected to an anode terminal of the solar battery 1; a positive input terminal of the comparator 17 is connected to the positive terminal of the secondary battery 3; and the output L6 of the comparator 17 is input to the microcomputer 6. The remaining construction is the same as that of the first embodiment.

In the second embodiment according to the present invention, when a pulse is provided from the clock circuit 11 on the line L1, the transistor 7 becomes ON to execute the battery-checking operation in the same manner as that described in the first embodiment. In the second embodiment, however, the boosting circuit 16 subsequently operates, and the comparator 17 is driven by means of the boosted power supply.

While the charging from the solar battery 1 to the secondary battery 3 is being conducted, an anode-terminal voltage of the back-flow preventive diode 2 becomes higher than a cathode-terminal voltage. Therefore, the output of the comparator 17 becomes a low level. The battery-checking operation can be executed while the microcomputer 6 is receiving the low-level signal.

To the contrary, while the charging from the solar battery 1 to the secondary battery 3 is not being conducted, the anode-terminal voltage of the backflow preventive diode 2 becomes lower than a cathode-terminal voltage. Therefore, the output of the comparator 17 is inverted to be at a high level.

When receiving the high-level signal, the microcomputer 6 inverts the level of the line L5 to be a high level;

makes the transistor turn OFF; and stops the battery-checking operation.

Accordingly, in the second embodiment, when the charging operation from the solar battery 1 is not executed during the period of time for the periodical battery checking operation, the battery-checking operation is stopped to prevent the wasteful power consumption.

The description of the operation of the second embodiment will now be given in conjunction with a flow-chart shown in FIG. 7 which illustrates the operation of the microcomputer 6.

The microcomputer 6 conducts a sequential operation in accordance with the following steps:

In a step 11, the microcomputer 6 makes a decision whether the L1 input signal is at a high level or a low level;

In a step 12, the PNP transistor 7 for switching power-supply becomes ON when the L1 signal is at a high level;

In a step 13, the microcomputer 6 made a decision whether the output of the comparator 17 is at a high level or a low level;

In a step 14, when the L6 signal is at a low level, the charging operation from the solar battery 1 to the secondary battery 3 is being conducted; therefore, the microcomputer 6 inputs the parallel signal L3 from the A/D converter 15;

In a step 15, a parallel signal input from L3 is converted to a serial signal. Subsequently, a serial transmission of the serial signal to the clock circuit 11 from the L2 line is executed;

In a step 16, the microcomputer 6 again makes a decision whether the L1 input signal is at a high level or a low level. If the signal keeps high level, the operation from the step 12 is repeated.

In a step 17, when the L1 signal is inverted into the low level, the PNP transistor for switching power-supply turns OFF, and this sequential operation is in the stand-by mode in the step 1;

In a step 18, when the L6 signal is recognized to be at a high level from the operation of step 13, the charging operation from the solar battery 1 to the secondary battery 3 is not being executed. Therefore, the microcomputer 6 makes the PNP transistor 7 switch the power-supply to ON; and In a step 19, the microcomputer 6 again makes a decision whether the L1 input signal is at a high level or a low level. When the L1 signal is inverted into the low level, this sequential operation will be in the stand-by mode in the step 11.

Meanwhile, a camera equipped with a world clock, for instance, can perform the suitable battery-checking operation regardless of the difference in time by conducting a switching operation of the clock display for each country.

According to the above-mentioned preferred embodiments, the camera having a function of charging the second battery from the solar battery can frequently execute the battery-checking operation during the day-time when charging is frequently conducted, and also can execute the battery-checking operation less frequently or stop the battery-checking operation during the nighttime when the charging is less-frequently conducted by controlling the battery-checking operation of detecting voltage of the secondary battery by using the clock circuit. Accordingly, wasteful power-consumption caused by the checking operation itself can be greatly reduced without lowering the accuracy of the battery-checking operation. Furthermore, the current battery information can always be obtained because of updating the display of the remaining power of the second battery without conducting any operation.

Furthermore, due to varied control-interval of the battery check in accordance with a time period, the above-mentioned battery-checking operation can be broadly applicable not only to the cameras having the solar battery but also to a monitor camera, for instance, in which the frequency of photographing intervals varies in the daytime and the nighttime and further to products other than cameras.

In the above-mentioned preferred embodiments, the camera has a displaying feature to inform a user of the charged state of the second battery. However, it is needless to say that this displaying feature can be replaced with various informing-means such as sound or the like.

In the second embodiments, the battery checking operation is completely stopped when the charging operation is not conducted during the battery checking period of the clock circuit. However, the battery checking operation is not necessarily stopped completely but can be restrictive.

The individual components shown in schematic or block form in the drawings are all well-known in the camera arts, and their specific construction and operation are not critical to the operation or best mode for carrying out the invention.

While the present invention has been described with respect to what is presently considered to be the preferred embodiments, it is to be understood that the present invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera comprising:
   (A) a solar cell;
   (B) a chargeable battery to be charged by said solar cell;
   (C) battery-checking means for checking a charged state of said chargeable battery;
   (D) indicating means for indicating the charged state of said chargeable battery checked by said battery-checking means; and
   (E) time counting means for operating said battery-checking means at a predetermined interval.

2. A camera according to claim 1, wherein said indicating means comprises displaying means.

3. A camera according to claim 1, wherein said time counting means comprises means for varying the predetermined interval for operating said battery-checking means between the time period when a charging operation is expected to occur with a high degree of frequency and the time period when the charging operation is expected to occur with a low degree of frequency.

4. A camera according to claim 1, wherein said time counting means comprises means for providing a short interval regarding the predetermined interval for operating said battery-checking means when a charging operation is expected to occur with a high degree, and also providing a long interval regarding the predetermined interval when the charging operation is expected to occur with a low degree.

5. A camera according to claim 1, wherein said time counting means comprises means for varying the predetermined interval for operating said battery-checking means between daytime and nighttime.

6. A camera according to claim 1, wherein said time counting means comprises means for providing a short intervals regarding the predetermined interval for operating said battery-checking means during the daytime, and also providing a long interval regarding the predetermined interval during the nighttime.

7. A camera according to claim 1, further comprising:
regulating means for regulating an operation of said battery-checking means when said chargeable battery is not conducting a charging operation during an operation of said battery-checking means being conducted by said time counting means.

8. A camera according to claim 7, wherein said regulating means comprises means for prohibiting the operation of said battery-checking means.

9. A battery checking unit adapted for a chargeable battery which is used for a camera and is charged by a solar cell, comprising:
(A) a solar cell;
(B) a chargeable battery to be charged by said solar cell;
(C) battery-checking means for checking a charged state of said chargeable battery;
(D) indicating means for indicating the charged state of said chargeable battery checked by said battery-checking means; and
(E) time counting means for operating said battery-checking means at a predetermined interval.

10. A battery checking unit according to claim 9, wherein said indicating means comprises displaying means.

11. A battery checking unit according to claim 9, wherein said time counting means comprises means for varying the predetermined interval for operating said battery-checking means between the time period when a charging operation is expected to occur with a high degree and the time period when the charging operation is expected to occur with a low degree.

12. A battery checking unit according to claim 9, wherein said time counting means comprises means for providing a short interval regarding the predetermined interval for operating said battery-checking means when a charging operation is expected to occur with a high degree, and also providing a long interval when the charging operation is expected to occur with a low degree.

13. A battery checking unit according to claim 9, wherein said time counting means comprises means for varying the predetermined interval for operating said battery-checking means between daytime and nighttime.

14. A battery checking unit according to claim 9, wherein said time counting means comprises means for providing a short interval regarding said predetermined intervals for operating said battery-checking means during the daytime, and also providing a long interval during the nighttime.

15. A battery checking unit according to claim 9, further comprising:
regulating means for regulating an operation of said battery-checking operation when said chargeable battery is not conducting a charging operation during an operation of said battery-checking means being conducted by said time counting means.

16. A battery checking unit according to claim 15, wherein said regulating means comprises means for prohibiting the operation of said battery-checking means.

17. An apparatus, comprising:
(A) a solar cell;
(B) a chargeable battery to be charged by said solar cell;
(C) battery-checking means for checking a charged state of said chargeable battery;
(D) indicating means for indicating the charged state of said chargeable battery checked through said battery-checking means; and
(E) time counting means for operating said battery-checking means at a predetermined interval.

18. An apparatus according to claim 17, wherein said indicating means comprises displaying means.

19. An apparatus according to claim 17, wherein said clock means comprises means for varying the predetermined interval for operating said battery-checking means between the time period when a charging operation is expected to occur with a high degree of frequency and the time period when the charging operation is expected to occur with a low degree of frequency.

20. An apparatus according to claim 17, wherein said time counting means comprises means for providing a short interval regarding said predetermined interval for operating said battery-checking means when a charging operation is expected to occur with a high degree of frequency, and also providing a long interval when the charging operation is expected to occur with a low degree of frequency.

21. An apparatus according to claim 17, wherein said time counting means comprises means for varying said predetermined interval for operating said battery-checking means between daytime and nighttime.

22. An apparatus according to claim 17, wherein said time counting means comprises means for providing a short interval regarding said predetermined interval for operating said battery-checking means during the daytime, and also providing a long interval during the nighttime.

23. An apparatus according to claim 15, further comprising:
regulating means for regulating an operation of said battery-checking means when said secondary battery is not conducting a charging operation during an operation of said battery-checking means being conducted by said time counting means.

24. An apparatus according to claim 23, wherein said regulating means comprises means for prohibiting the operation of said battery-checking means.

25. A battery checking unit adapted for a chargeable battery which is used for an apparatus and is charged by a solar cell, comprising:
(A) battery-checking means for checking a charged state of said chargeable battery;
(B) indicating means for indicating the charged state of said chargeable battery checked by said battery-checking means; and
(C) time counting means for operating said battery-checking at a predetermined interval.

26. A battery checking unit according to claim 25, wherein said indicating means comprises displaying means.

27. A battery checking unit according to claim 25, wherein said time counting means comprises means for varying the predetermined interval for operating said battery-checking means between the time period when a charging operation is expected to occur with a high degree and the time period when the charging operation is expected to occur with a low degree.

28. A battery checking unit according to claim 25, wherein said time counting means comprises means for providing a short interval regarding the predetermined interval for operating said battery-checking means when a charging operation is expected to occur with a high degree, and also providing a long interval when the charging operation is expected to occur with a low degree.

29. A battery checking unit according to claim 25, wherein said time counting means comprises means for varying the predetermined interval for operating said battery-checking means between daytime and nighttime.

30. A battery checking unit according to claim 25, wherein said time counting means comprises means for providing a short interval regarding said predetermined interval for operating said battery-checking means during the daytime, and also providing a long interval during the nighttime.

31. A battery checking unit according to claim 25, further comprising:
regulating means for regulating an operation of said battery-checking means when said chargeable battery is not conducting a charging operation during the operation of said battery-checking means being conducted by said time counting means.

32. A battery checking unit according to claim 31, wherein said regulating means comprises means for prohibiting the operation of said battery-checking means.

33. A camera adapted to use a chargeable battery to be charged by a solar cell, comprising:
(A) battery-checking means for checking a charged state of said chargeable battery;
(B) indicating means for indicating the charged state of said chargeable battery checked by said battery-checking means; and
(C) time counting means for operating said battery-checking means at a predetermined interval.

34. A camera according to claim 33, wherein said indicating means comprises displaying means.

35. A camera according to claim 33, wherein said time counting means comprises means for varying the predetermined interval for operating said battery-checking means between the time period when a charging operation is expected to occur with a high degree of frequency and the time period when the charging operation is expected to occur with a low degree of frequency.

36. A camera according to claim 33, wherein said time counting means comprises means for providing a short interval regarding the predetermined interval for operating said battery-checking means when a charging operation is expected to occur with a high degree, and also providing a long interval regarding the predetermined interval when the charging operation is expected to occur with a low degree.

37. A camera according to claim 33, wherein said time counting means comprises means for varying the predetermined interval for operating said battery-checking means between daytime and nighttime.

38. A camera according to claim 33, wherein said time counting means comprises for providing a short interval regarding the predetermined interval for operating said battery-checking means during the daytime, and also providing a long interval regarding the predetermined interval during the nighttime.

39. A camera according to claim 33, further comprising:
regulating means for regulating an operation of said battery-checking means when said chargeable battery is not conducting a charging operation during an operation of said battery-checking means being conducted by said time counting means.

40. A camera according to claim 39, wherein said regulating means comprises means for prohibiting the operation of said battery-checking means.

41. A battery checking unit adapted for a chargeable battery to be charged by a solar cell, comprising:
(A) a solar cell;
(B) a chargeable battery to be charged by said solar cell;
(C) battery-checking means for checking a charged state of said chargeable battery;
(D) indicating means for indicating the charged state of said chargeable battery checked by said battery-checking means; and
(E) time counting means for operating said battery-checking means at a predetermined interval.

42. A battery checking unit according to claim 41, wherein said indicating means comprises displaying means.

43. A battery checking unit according to claim 41, wherein said time counting means comprises means for varying the predetermined interval for operating said battery-checking means between the time period when a charging operation is expected to occur with a high degree and the time period when the charging operation is expected to occur with a low degree.

44. A battery checking unit according to claim 41, wherein said time counting means comprises means for providing a short interval regarding the predetermined interval for operating said battery-checking means when a charging operation is expected to occur with a high degree, and also providing a long interval when the charging operation is expected to occur with a low degree.

45. A battery checking unit according to claim 41, wherein said time counting means comprises means for varying the predetermined interval for operating said battery-checking means between daytime and nighttime.

46. A battery checking unit according to claim 41, wherein said time counting means comprises means for providing a short interval regarding said predetermined intervals for operating said battery-checking means during the daytime, and also providing a long interval during the nighttime.

47. A battery checking unit according to claim 41, further comprising:
regulating means for regulating an operation of said battery-checking means when said chargeable battery is not conducting a charging operation during an operation of said battery-checking means being conducted by said time counting means.

48. A battery checking unit of a camera according to claim 47, wherein said regulating means comprises means for prohibiting the operation of said battery-checking means.

49. An apparatus adapted to use a chargeable battery to be charged by a solar cell, comprising:
   (A) battery-checking means for checking a charged state of said chargeable battery;
   (B) indicating means for indicating the charged state of said chargeable battery checked through said battery-checking means; and
   (C) time counting means for operating said battery-checking means at a predetermined interval.

50. An apparatus according to claim 49, wherein said indicating means comprises displaying means.

51. An apparatus according to claim 49, wherein said time counting means comprises means for varying the predetermined interval for operating said battery-checking means between the time period when a charging operation is expected to occur with a high degree of frequency and the time period when the charging operation is expected to occur with a low degree of frequency.

52. An apparatus according to claim 49, wherein said time counting means comprises means for providing a short interval regarding said predetermined interval for operating said battery-checking means when a charging operation is expected to occur with a high degree of frequency, and also providing a long interval when the charging operation is expected to occur with a low degree of frequency.

53. An apparatus according to claim 49, wherein said time counting means comprises means for varying said predetermined interval for operating said battery-checking means between daytime and nighttime.

54. An apparatus according to claim 49, wherein said clock means comprises means for providing short intervals regarding said predetermined intervals for operating said battery-checking means during the daytime, and also providing long intervals during the nighttime.

55. An apparatus according to claim 49, further comprising:
   regulating means for regulating an operation of said battery-checking means when said secondary battery is not conducting a charging operation during an operation of said battery-checking means being conducted by said time counting means.

56. An apparatus according to claim 55, wherein said regulating means comprises means for prohibiting the operation of said battery-checking means.

57. A battery checking unit adapted for a chargeable battery to be charged by a solar cell, comprising:
   (A) battery-checking means for checking a charged state of said chargeable battery;
   (B) indicating means for indicating the charged state of said chargeable battery checked by said battery-checking means; and
   (C) time counting means for operating said battery-checking at a predetermined interval.

58. A battery checking unit according to claim 57, wherein said indicating means comprises displaying means.

59. A battery checking unit according to claim 57, wherein said time counting means comprises means for varying the predetermined interval for operating said battery-checking means between the time period when a charging operation is expected to occur with a high degree and the time period when the charging operation is expected to occur with a low degree.

60. A battery checking unit according to claim 57, wherein said time counting means comprises means for providing a short interval regarding the predetermined interval for operating said battery-checking means when a charging operation is expected to occur with a high degree, and also providing a long interval when the charging operation is expected to occur with a low degree.

61. A battery checking unit according to claim 57, wherein said clock means comprises means for varying the predetermined interval for operating said battery-checking means between daytime and nighttime.

62. A battery checking unit according to claim 57, wherein said time counting means comprises means for providing a short interval regarding said predetermined interval for operating said battery-checking means during the daytime, and also providing a long interval during the nighttime.

63. A battery checking unit according to claim 57, further comprising:
   regulating means for regulating an operation of said battery-checking operation when said chargeable battery is not conducting a charging operation during the operation of said battery-checking means being conducted by said time counting means.

64. A battery checking unit according to claim 63, wherein said regulating means comprises means for prohibiting the operation of said battery-checking means.

* * * * *

UNITED STATES PATENT AND TRADEMARK OFFICE
CERTIFICATE OF CORRECTION

PATENT NO. : 5,424,800
DATED : June 13, 1995
INVENTOR(S) : Ryoichi Suzuki

It is certified that error appears in the above-indentified patent and that said Letters Patent is hereby corrected as shown below:

COLUMN 2:

Line 55, "aspect" should read --aspects--; and
    Line 63, "of an" should read --of a--.

COLUMN 8:

Line 19, "embodiments," should read --embodiment,--.

COLUMN 9:

Line 9, "intervals" should read --interval--; and
    Line 23, "battery" should read --battery,--.

COLUMN 10:

Line 21, "clock" should read --time counting--;
    Line 49, "secondary" should read --chargeable--; and
    Line 65, "checking" should read --checking means--.

COLUMN 12:

Line 2, "comprises" should read --comprises means--;
    Line 55, "intervals" should read --interval--; and,
    Line 65, "of a camera" should be deleted.

COLUMN 13:

Line 33, "clock" should read --time counting-- and "short" should read --a short--;
    Line 34, "vals" should read "val" and "intervals" should read --interval--; and
    Line 36, "long intervals" should read --a long interval--.

UNITED STATES PATENT AND TRADEMARK OFFICE
CERTIFICATE OF CORRECTION

PATENT NO. : 5,424,800
DATED : June 13, 1995
INVENTOR(S) : Ryoichi Suzuki

It is certified that error appears in the above-indentified patent and that said Letters Patent is hereby corrected as shown below:

COLUMN 14:

Line 7, "checking" should read --checking means--; and
Line 27, "clock" should read --time counting--.

Signed and Sealed this

Nineteenth Day of December, 1995

Attest:

BRUCE LEHMAN

Attesting Officer    Commissioner of Patents and Trademarks